United States Patent [19]

Komkov et al.

[11] Patent Number: 5,686,037

[45] Date of Patent: Nov. 11, 1997

[54] METHOD AND RAW CERAMIC MASS FOR MANUFACTURING BUILDING ELEMENTS

[75] Inventors: Semyon K. Komkov; Semyon A. Ryabinky, both of St. Petersburg, Russian Federation

[73] Assignee: Express-Ceramica Ltd., St. Petersburg, Russian Federation

[21] Appl. No.: 552,454

[22] Filed: Nov. 3, 1995

[30] Foreign Application Priority Data

Nov. 4, 1994 [RU] Russian Federation .............. 4040399

[51] Int. Cl.$^6$ .................................................... C04B 33/30
[52] U.S. Cl. .................. 264/234; 264/82; 264/DIG. 43; 264/235; 264/345; 501/141
[58] Field of Search ........................... 264/82, DIG. 43, 264/345, 234, 235

[56] References Cited

U.S. PATENT DOCUMENTS

| | | | |
|---|---|---|---|
| 1,666,936 | 4/1928 | Kevn | 264/82 |
| 4,048,276 | 9/1977 | Hansen | 264/82 |

FOREIGN PATENT DOCUMENTS

| | | |
|---|---|---|
| 2572723 | 5/1986 | France . |
| 2004518 | 12/1993 | Russian Federation . |

OTHER PUBLICATIONS

Zorokhovitch V.C. et al, *Manufacturing of Bricks*, Styroyizdat Publishers, Leningrad, 1988, pp. 6–8.

*Primary Examiner*—James Derrington
*Attorney, Agent, or Firm*—Trevor C. Klotz

[57] ABSTRACT

This invention relates to a novel ceramic mass or material and the use of same in the building materials industry for manufacturing bricks, ceramic stones, roofing tiles, large block and the like. A formable ceramic mass is prepared by mixing clay, a filler such as sand, calcium hydroxide, which can be in the form of slaked lime, and an aqueous solution of solidification activating agent. The formable mass is then shaped, e.g. by plastic moulding into uncured building elements which are in turn subjected to heat treatment, including a preliminary drying, a thermal treatment in a saturated vapour atmosphere, and a subsequent further heating and drying with a gradual lowering of moisture content. The preliminary drying is carried out at a temperature of 60°–70° C. to reduce the moisture content to 12–14%. The thermal treatment is performed at a temperature of 95°–100° C. for 2–4 hours, and the final heating and drying step is performed during 8–10 hours by means of a gradual raising of temperature to 120°–130° C. and maintaining to this temperature while reducing the relative humidity of the surrounding air. The dry components content of the raw or uncured ceramic mass or material, is in the following limits, % wt: sand 0.1–50.0; calcium hydroxide 4.5–20.0; solidification activating agent 0.3–4.0; and clay constituting the balance.

6 Claims, No Drawings

METHOD AND RAW CERAMIC MASS FOR MANUFACTURING BUILDING ELEMENTS

FIELD OF INVENTION

This invention relates to the building materials industry and can be used in manufacturing ceramic building articles, for example bricks, ceramic stones, roofing tiles, large blocks and the like. More particularly, it relates to a novel ceramic mass composition and a method of producing solid building elements using this composition.

DESCRIPTION OF PRIOR ART

A known method used in the manufacture of building articles, and which comprises ceramic mass preparation, plastic shaping of articles, drying and subsequent calcination thereof is disclosed by Zorokhovitch V. C. et al, *Manufacturing of Bricks*, Stroyizdat Publishers, Leningrad, 1988, pp.6–8. The main raw material for ceramic mass preparation according to this known method is clay, to which the leaning and burning-out additives are added. The leaning additives (silica sand, chamot, etc.) decrease the shrinkage and the internal stresses during drying and calcination. The pulverized solid fuel (anthracite, coke fines, sawdust, etc.) are used as the burning-out additives that intensify the calcination process, improve the sintering ability of the mass, and increase the strength of the finished articles.

A significant stage of the above described process is the calcination of the shaped articles which has inherent drawbacks such as the inability to use carbonate containing clays, low production and high production cost for the finished product. Additionally, high calcination temperatures,— about 950°–1100° C. contributes not only a high energy consumption and associated costs of energy, but also creates environmental concerns (emissions of nitrogen, sulphur and carbon oxides, for example), the solving of which additionally increases production costs.

Another known method used in the manufacture of building articles comprises ceramic mass preparation by means of mixing powders of clay, leaning and active additives, and tempering them with an active solution, the plastic shaping of the articles, and the heat treatment thereof is disclosed in French Patent 2,572,723. The heat treatment step comprises a preliminary drying and maturing to a finished shrinkage size of the shaped articles at the temperature of 40°–65° C. during 2–4 hours, a thermal treatment in closed atmosphere of saturated vapour at 120°–130° C. with gradual lowering of moisture content, and a further drying in open atmosphere for approximately 2–12 hours; the overall duration being about 18 to 36 hours. The ceramic mass contains silica sand as a leaning additive, slaked lime as an active additive, and, for example, a solution of caustic soda as an active solution. Optimal content of each component is chosen on the basis of specific surface of the active fraction of clay, determined by the absorption of methylene blue.

Yet another known method for manufacturing building articles is disclosed in Russian Patent No. 2,004,518 and comprises ceramic mass preparation by means of mixing powders of clay, slaked lime, and sand, and tempering them with caustic soda solution to obtain a moisture content of 16–22% for shaping, the plastic shaping of this mass into articles, and the heat treatment thereof. The heat treatment comprises a heating of the shaped articles to a temperature of 110°–120° C. over 2–3 hours in a closed atmosphere, a steaming of said articles at the same temperature for 8–10 hours, and a subsequent drying thereof at the same temperature for 2–3 hours.

The absence of a high-temperature calcination stage as disclosed in the above referenced French and Russian patents significantly lowers the production costs of a finished product and also improve the environmental parameters of the process. However, there also exists some disadvantages. The use of clay in the form of a powder makes production more complicated as it is necessary to dry and grind the clay. It has also been found the strength of the articles produced with the ceramic mass according to method disclosed in French Patent 2,572,723 is not sufficiently high, while the duration of the cycle for production of finished articles is too long and the water absorption of the finished articles is high.

SUMMARY OF INVENTION

The purpose of the present invention is to overcome or minimize the disadvantages of the abovementioned methods.

The ceramic mass which has been found useful in the production of solid building elements of this invention comprises a mixture of preselected quantities of clay and sand with preselected quantities of calcium hydroxide and a solidification activating agent. On a dry weight basis, this mass contains 1–50% sand, 4.5–20.0% calcium hydroxide, 0.3 to 4.0% solidification activating agent, and the balance being clay. Preferably, the calcium hydroxide is in the form of slaked lime and the solidification activating agent is selected from the group consisting of caustic soda, sodium carbonate and ammonia salts. Since this ceramic mass is to be shaped into uncured building elements prior to solidification, the preferred moisture content of the mass is in the range of 16 to 24%.

In accordance with the method of this invention, the above described mass of ceramic material which has been formed into uncured building elements is cured or solidified by first heating them at a temperature from 60°–70° C. for a time sufficient to reduce their moisture content to a range from 12 to 14% on a dry weight basis. These elements then undergo heating at a temperature from 95° to 100° C. in a closed environment of water saturated air for approximately 2 to 4 hours and thereafter, undergo additional heating and drying at a temperature ranging from 120° C. to 130° C. while gradually reducing the moisture content of the surrounding air. This drying and heating step is for a predetermined time which can approximate from 8 to 10 hours or a time corresponding to that required to reduce the relative humidity of the surrounding air to approximately 3%. In a preferred embodiment, the gradual reduction of moisture content is reduced at a rate of no greater than 10% per hour.

Typically, the initial drying step can be carried out or over a 1.5 to a 4 hour period while the heating in the closed environment with saturated air at a temperature from 95° to 100° C. can take the approximate same length of time while the final heating and drying of the elements in the temperature range of 120° C. to 130° C. can take place over an 8 to 10 hour period. Further, the rate of temperature increase from the initial drying step to the saturated air heating step in the closed environment, preferably, is no greater than 60° C. per hour.

In accordance with an additional embodiment pertaining to the method of this invention, the uncured building elements which have been solidified using the foregoing techniques, prior to removal and storage, can be advantageously further cooled to a temperature of approximately 70° C. employing ambient air for this purpose and also using a controlled cooling rate of no greater than 50° C. per hour.

DETAILED DESCRIPTION

The novel method of the present invention is illustrated by way of the following example:

Clay from a quarry passes through clay-loosening machine and is transported by a belt conveyor to a clay and sand supply unit. Sand from a quarry is also transported by a belt conveyor to the same supply unit where the proportioning of clay and sand is performed. The mix of clay and sand is then fed by a conveyor to a hopper with a batcher (e.g. apron conveyor) feeding the mix to a mixer.

Calcium hydroxide, typically in the form of slaked lime, is supplied by pneumatic conveyor from a storage to a supply unit and further by a worm feeder, to the mixer.

A solidification activating agent, such as an aqueous solution of caustic soda or sodium carbonate or ammonia salts, is fed to the mixer by a fluid doser. The moisture content of the mass obtained desirably should be in the 16–24% range, and depends upon the plastic and rheological properties of the clay component.

The ceramic mass prepared in the mixer is then transported by a belt conveyor to an edgerunner mill, then to a fine-grinding roller and further to a vacuum extruder. The abovementioned mill and rollers can be replaced by planetary, rotor or other types of mills that could provide a dispersion and uniform spreading of components in the mass, as is well known in the art.

A continuous shaped beam from an extruder, such as a vacuum extruder of the fully mixed mass is cut into sections of the desired size by an automated cutting tool. The cut sections are then loaded in cassette form on special pallets which in turn are loaded by a crane into thermal treatment chambers. Preferably, the chamber volume filling coefficient should be in the range of 0.5 to 0.75. In the chambers an induced circulation of an energy-containing agent (air-vapour mixture) is organized along a closed circuit: heat exchanger—process zone—heat exchanger.

The cut articles are steadily heated in the chamber for 0.5–1 hours in the open atmosphere to 60° C. in order to reach a residual moisture content of 12–14% (dry weight). Next, the cut articles are heated in a closed atmosphere, up to 95°–100°; the heating rate being not higher than 60 degrees per hour, and are maintained at this temperature for 2–4 hours. After that, the temperature is again raised to 120°–130° C., with the articles being exposed to this temperature for 8–10 hours in an initially saturated air-vapour chamber environment. Excess moisture is slowly removed from the chamber (not faster than 10% per hour).

Moisture is evacuated from the chamber by means of gradual replacement of air-vapour atmosphere by a dry air while the temperature in the chamber is maintained in the range of 120°–130° C. When the humidity in the chamber decreases to 3%, the heating of the chamber is stopped, and the chamber permitted to cool to 70° C. by means of a supply of ambient air which removes heated air from the chamber. The cooling rate preferably should be less than 50° C. per hour. After cooling of the articles to the said temperature, the chamber or chambers are opened, and the cassettes solidified articles recovered by a crane. The heat treated articles are then discharged from their cassettes, and moved to a product storage area.

In Table 1 below, different raw mass compositions (recalculated to dry components weight) for four clays of various mineralogical compositions, and the properties of the articles produced using the method of this invention, are shown. Calcium hydroxide was used in the form of slaked lime. Caustic soda was used as the solidification activating agent.

TABLE 1

| Components content (dry wt. %) | | | | Properties of articles | | |
|---|---|---|---|---|---|---|
| Clay | Sand | Calcium hydroxide | Activating agent | Compression strength | Water-proofness | Notes |
| Clay No. 1 | | | | | | |
| 70 | 20 | 7 | 3 | 165 | 0.77 | |
| 40 | 43 | 14 | 3 | 205 | 0.85 | |
| 40 | 50 | 7 | 3 | 190 | 0.85 | |
| 65 | 17 | 15 | 3 | 250 | 0.83 | |
| 50 | 30 | 17 | 3 | 290 | 0.87 | |
| 50 | 41 | 6 | 3 | 155 | 0.78 | |
| 50 | 36 | 10 | 4 | 307 | 0.82 | |
| 50 | 33 | 15 | 2 | 210 | 0.78 | |
| 70 | 17 | 11 | 2 | 180 | 0.75 | |
| 70 | 20 | 6 | 4 | 168 | 0.75 | |
| 50 | 35 | 12 | 3 | 305 | 0.86 | |
| 57 | 28 | 12 | 3 | 312 | 0.83 | |
| 44 | 44 | 9 | 3 | 260 | 0.81 | |
| 53.5 | 32 | 11 | 3.5 | 320 | 0.85 | Optimal |
| Clay No. 2 | | | | | | |
| 90 | 3.7 | 4.5 | 1.8 | 180 | 0.75 | |
| 90 | 1 | 8.7 | 0.3 | 250 | 0.75 | |
| 80 | 10 | 9 | 1 | 270 | 0.81 | |
| 80 | 10 | 8 | 2 | 290 | 0.76 | |
| 80 | 10 | 8.8 | 1.2 | 270 | 0.83 | Optimal |
| Clay No. 3 | | | | | | |
| 87 | 0.1 | 12 | 0.9 | 230 | 0.80 | |
| 90 | 0.1 | 9 | 0.9 | 250 | 0.78 | |
| 80 | 0.1 | 17 | 2.9 | 310 | 0.75 | |
| 65.5 | 13.4 | 20 | 1.1 | 320 | 0.75 | |
| 65.5 | 16.4 | 17.45 | 0.65 | 200 | 0.84 | Optimal |
| Clay No. 4 | | | | | | |
| 81.2 | 10 | 8 | 0.8 | 190 | 0.75 | |
| 76.8 | 10 | 12 | 1.2 | 220 | 0.77 | |
| 77 | 6.5 | 16 | 0.5 | 250 | 0.75 | |
| 76.5 | 6.5 | 16 | 1 | 270 | 0.78 | |
| 76 | 6.8 | 15.7 | 1.5 | 300 | 0.83 | |
| 66 | 16.8 | 15.7 | 1.5 | 320 | 0.85 | Optimal |

The compositions for each of the four clays which are designated as "optional" correspond to a finished product which exhibits a high strength and sufficiently high waterproofness, and which are also characterized by good plasticity of shaped ceramic mass that is important for extruding large articles.

Those compositions approaching the upper limits for calcium hydroxide and solidification activating agent, are high in compression strength of the finished product but not necessarily in waterproofness.

The upper limit for sand content and the lower limit for clay content are dictated by decreases in the mass plasticity and material strength. The lower limit for sand content sets the minimum amount of leaning agent, below which the number of cracks in the articles after heat treatment will grow, causing defective products due to high shrinkage.

The upper limit for calcium hydroxide content (20%) is set due to the fact that the further increase in its content have no significant effect on the product properties, and due to economical reasons (relatively high cost of this component).

We claim:

1. A method of producing solid building elements of a predetermined shape from a formable ceramic material, comprising the steps of:
   (a) preparing said formable ceramic material from a mixture of preselected quantities of clay and sand with preselected quantities of calcium hydroxide and an aqueous solution of a solidification activating agent;

(b) shaping said formable ceramic material into uncured building elements;

(c) solidifying said uncured building elements by (i) drying at a temperature from 60° to 70° C. for a time sufficient to reduce their moisture content to a range of from 12 to 14% on a dry weight basis;

(ii) heating said elements at a temperature from 95° to 100° C. in a closed environment of water saturated air for 2 to 4 hours; and (iii) further heating and drying said elements at a temperature from 120° to 130° C. in a chamber while gradually replacing the atmosphere in the chamber with dry air to remove excess moisture at a rate not faster than 10% per hour and for a period of 8 to 10 hours or until the humidity in the chamber reaches 3%.

2. The method as claimed in claim 1, wherein said mixture of formable ceramic material contains on a dry weight basis 1 to 50% sand, 4.5 to 20% calcium hydroxide, 0.3 to 4.0% solidification active ingredient and the balance being clay.

3. The process as claimed in claim 2, wherein the calcium hydroxide is in the form of slaked lime and the solidification activation agent is selected from the group consisting of caustic soda, sodium carbonate and ammonia salts.

4. The process as claimed in claim 3 wherein the moisture content of said formable ceramic material is from 16 to 24% on a dry weight basis.

5. The process as claimed in claim 4, wherein said uncured building elements are dried at from 60° to 70° C. for 1.5 to 2 hours.

6. The process as claimed in claim 3 wherein the solidified building elements are further cooled to a temperature of approximately 70° C. with ambient air at a cooling rate of no greater than 50° C. per hour.

* * * * *